(12) United States Patent
Zhu et al.

(10) Patent No.: US 11,414,096 B2
(45) Date of Patent: Aug. 16, 2022

(54) QP SPLINE PATH AND SPIRAL PATH BASED REFERENCE LINE SMOOTHING METHOD FOR AUTONOMOUS DRIVING

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Lin Ma, Beijing (CN); Xin Xu, Beijing (CN)

(73) Assignees: BAIDU USA LLC, Sunnyvale, CA (US); BAIDU.COM TIMES TECHNOLOGY (BEIJING) CO. LTD., Beijing (CN)

( * ) Notice: Subject to any disclaimer, the term of this patent is extended or adjusted under 35 U.S.C. 154(b) by 365 days.

(21) Appl. No.: 16/338,413

(22) PCT Filed: Mar. 28, 2019

(86) PCT No.: PCT/CN2019/080070
§ 371 (c)(1),
(2) Date: Mar. 29, 2019

(87) PCT Pub. No.: WO2020/191709
PCT Pub. Date: Oct. 1, 2020

(65) Prior Publication Data
US 2021/0188308 A1    Jun. 24, 2021

(51) Int. Cl.
*B60W 60/00*   (2020.01)
*B60W 40/06*   (2012.01)
*G01C 21/34*   (2006.01)

(52) U.S. Cl.
CPC .......... *B60W 60/001* (2020.02); *B60W 40/06* (2013.01); *G01C 21/3407* (2013.01); *B60W 2520/10* (2013.01); *B60W 2556/50* (2020.02)

(58) Field of Classification Search
CPC ............... B60W 60/001; B60W 40/06; B60W 2556/50; B60W 2520/10; G01C 21/3407
See application file for complete search history.

(56) References Cited

U.S. PATENT DOCUMENTS 5,109,340 A * 4/1992 Kanayama ........... G05D 1/0212
701/25
8,930,058 B1 * 1/2015 Quist ................... G05D 1/0221
701/23

(Continued)

OTHER PUBLICATIONS

Berglund, T., Brodnik, A., Jonsson, H., Mrozek, K., Staffanson, M., & Söderkvist, I. (2009) Planning Smooth Paths among Obstacles using Minimum Curvature Variation B-splines. (Year: 2009).*

*Primary Examiner* — Aniss Chad
*Assistant Examiner* — Stephanie T Su
(74) *Attorney, Agent, or Firm* — Womble Bond Dickinson (US) LLP

(57) ABSTRACT

In one embodiment, a method includes the operation of segmenting a raw reference line into a plurality of reference line segments, including a first reference line segment, a second reference segment, and a third reference line segment in a sequential order, in response to receiving the raw reference line representing a route from a first location to a second location associated with an autonomous driving vehicle (ADV). The method further includes the operations of smoothing the first reference line segment and the third reference line segment using a Quadratic programming (QP) spline smoother; and smoothing the second reference line segment using a spiral smoother. Smoothed reference line segments from the plurality of reference line segments are connected to generate a smoothed reference line, which is to be used as a reference line of the route to control the ADV.

20 Claims, 10 Drawing Sheets

(56) References Cited

U.S. PATENT DOCUMENTS

2016/0313735 A1\* 10/2016 Berkemeier ......... A01B 69/008
2019/0361450 A1\* 11/2019 Sheckells ............. G05D 1/0212

\* cited by examiner

QP SPLINE PATH AND SPIRAL PATH BASED REFERENCE LINE SMOOTHING METHOD FOR AUTONOMOUS DRIVING

CROSS-REFERENCE TO RELATED APPLICATION

This patent application is a U.S. National Phase Application under 35 U.S.C. § 371 of International Application No. PCT/CN2019/080070, filed Mar. 28, 2019, entitled "A QP SPLINE PATH AND SPIRAL PATH BASED REFERENCE LINE SMOOTHING METHOD FOR AUTONOMOUS DRIVING," which is incorporated by reference herein by its entirety.

TECHNICAL FIELD

Embodiments of the present disclosure relate generally to operating autonomous driving vehicles. More particularly, embodiments of the disclosure relate to smoothing a reference line for operating autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. Motion planning and control are critical operations in autonomous driving. Particularly, trajectory planning is a critical component in an autonomous driving system. Conventional trajectory planning techniques rely heavily on high-quality reference lines, which are guidance paths, e.g., a center line of a road, for autonomous driving vehicles, to generate stable trajectories.

Reference lines can be generated from map data points, typically a sequence of two-dimensional (2D) points in the world coordinate. Reference lines directly generated from the map data points are raw reference lines, which may lack the required smoothness and therefore can lead to unstable and oscillating trajectories between planning cycles. As such, raw reference lines typically need to be smoothed using various smoothing techniques for better driving experiences.

SUMMARY

In a first aspect, the present disclosure provides a computer-implemented method for operating an autonomous driving vehicle (ADV), the method comprising: in response to receiving an initial reference line representing a route from a first location to a second location associated with an autonomous driving vehicle (ADV), segmenting the initial reference line into a plurality of reference line segments, including a first reference line segment, a second reference segment, and a third reference line segment in sequence; smoothing the first reference line segment and the third reference line segment using a Quadratic programming (QP) spline smoothing algorithm; smoothing the second reference line segment using a spiral smoothing algorithm; and connecting smoothed reference line segments from the plurality of reference line segments to generate a smoothed reference line, which is to be used as a reference line of the route to control the ADV.

In a second aspect, the present disclosure provides a non-transitory machine-readable medium having instructions stored therein for operating an autonomous driving vehicle (ADV), the instructions, when executed by a processor, causing the processor to perform operations, the operations comprising: in response to receiving an initial reference line representing a route from a first location to a second location associated with an autonomous driving vehicle (ADV), segmenting the initial reference line into a plurality of reference line segments, including a first reference line segment, a second reference segment, and a third reference line segment in sequence; smoothing the first reference line segment and the third reference line segment using a Quadratic programming (QP) spline smoothing algorithm; smoothing the second reference line segment using a spiral smoothing algorithm; and connecting smoothed reference line segments from the plurality of reference line segments to generate a smoothed reference line, which is to be used as a reference line of the route to control the ADV.

In a third aspect, the present disclosure provides a data processing system, comprising: a processor; and a memory coupled to the processor to store instructions, which when executed by the processor, cause the processor to perform operations, the operations including: in response to receiving an initial reference line representing a route from a first location to a second location associated with an autonomous driving vehicle (ADV), segmenting the initial reference line into a plurality of reference line segments, including a first reference line segment, a second reference segment, and a third reference line segment in sequence, smoothing the first reference line segment and the third reference line segment using a Quadratic programming (QP) spline smoothing algorithm, smoothing the second reference line segment using a spiral smoothing algorithm, and connecting smoothed reference line segments from the plurality of reference line segments to generate a smoothed reference line, which is to be used as a reference line of the route to control the ADV.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
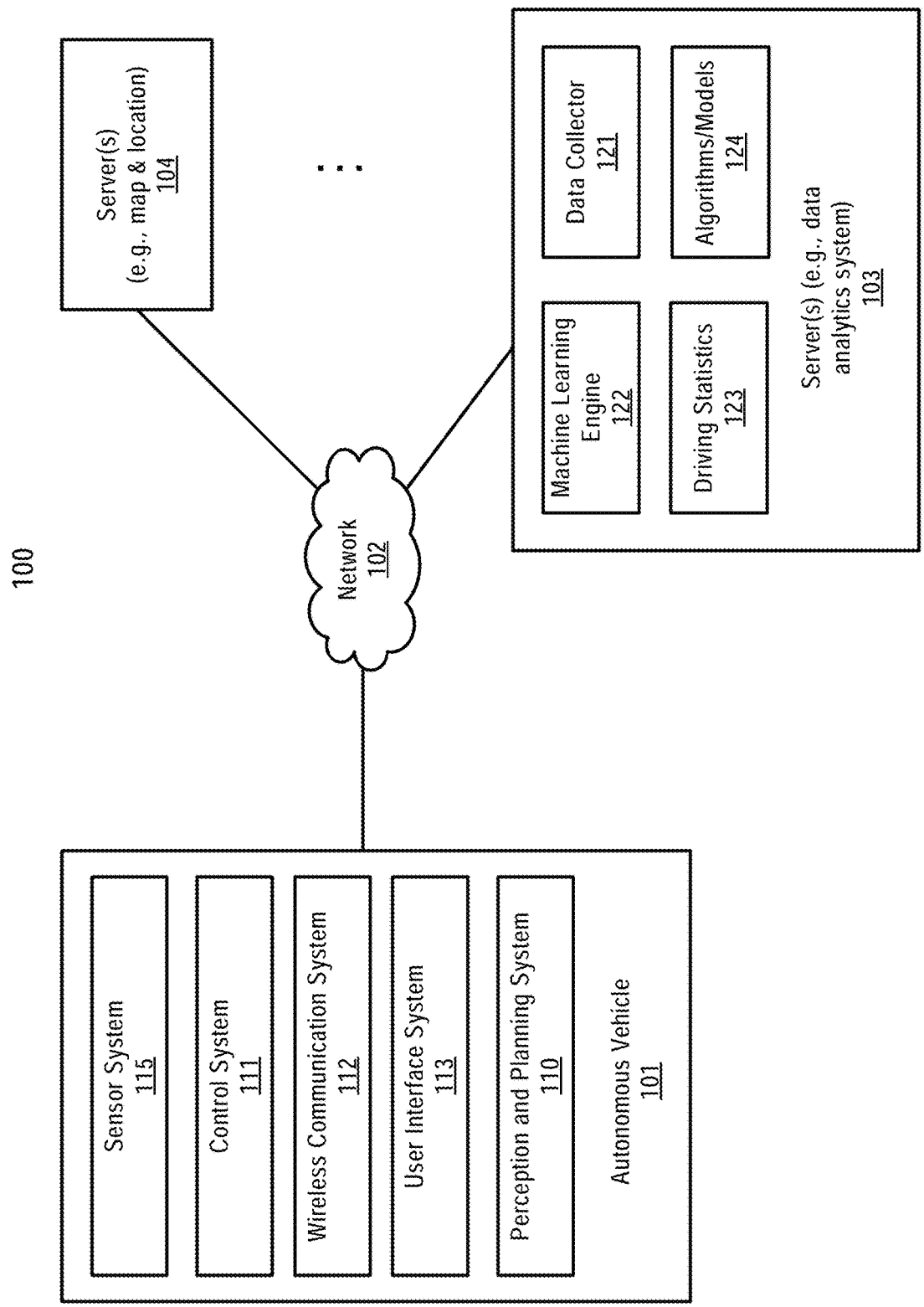
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As generally described above, various reference line smoothing techniques can be used to smooth a raw reference line for more comfortable driving. A reference line can be smoothed using either a Quadratic programming (QP) spline smoother or a spiral smoother. Each reference line smoother has its own drawbacks and is better suited to certain situations.

According to various embodiments, described herein are systems and methods for smoothing a raw reference line by alternating the use of a QP spline smoother and a spiral smoother. In one embodiment, the reference line can be divided into multiple reference line segments. The QP spline smoother can be applied to each odd-number reference line segment and the spiral smoother can be applied to each even-number reference line segment. In one implementation, the QP spiral smoother can be applied to smooth the first reference segment and the third reference line segment. The spiral smoother can subsequently be used in the same planning cycle or in a different planning cycle to smooth the second reference line segment to fill the gap between the first smoothed reference line segment and the third smoothed reference segment. The above pattern of alternating the use of the GP spline smoother and the spiral smoother can be repeated to the remaining reference line segments of the raw reference line until each reference line segment is smoothed and/or optimized.

In one embodiment, a method from smoothing a raw reference line includes the operation of segmenting a raw reference line into multiple reference line segments, including a first reference line segment, a second reference line segment, and a third reference line segment in a sequential order. The raw reference line is generated from map data points and can represent a route from a first location to a second location associated with an autonomous driving vehicle (ADV). The method further includes the operations of smoothing the first reference line segment and the third reference line segment using a QP spline smoother; and smoothing the second reference line segment using a spiral smoother. The smoothed second reference line segment is further optimized in view of a set of constraints, such that an output of an objective function reaches a minimum value while the set of constraints are satisfied. The two smoothing steps described above are then repeated until each of the multiple reference segments is smoothed. The smoothed reference line segments are connected to generate a smoothed reference line to be used as a reference line of the route to control the ADV.

In one embodiment, the length of each of the plurality of reference line segments is dynamically determined based on road conditions of the route and a speed of the ADV. At least one of the reference line segments is different in length from the other reference line segments.

In one embodiment, the first reference line segment and the second reference line segment can be smoothed using the QP smoother during a same planning cycle. In another embodiment, the first reference line segment and the second reference line segment can be smoothed using the QP smoother during a different planning cycle. In yet another embodiment, the first reference line segment, the second reference line segment, and the third reference line segment can be smoothed during the same planning cycle. Alternatively, each reference line segment can be smoothed and/or optimized in a separate planning cycle. In one embodiment, at least one of the set of constraints is dynamically tunable. The set of constraints can represent an initial location, a direction, and a curvature of the ADV.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
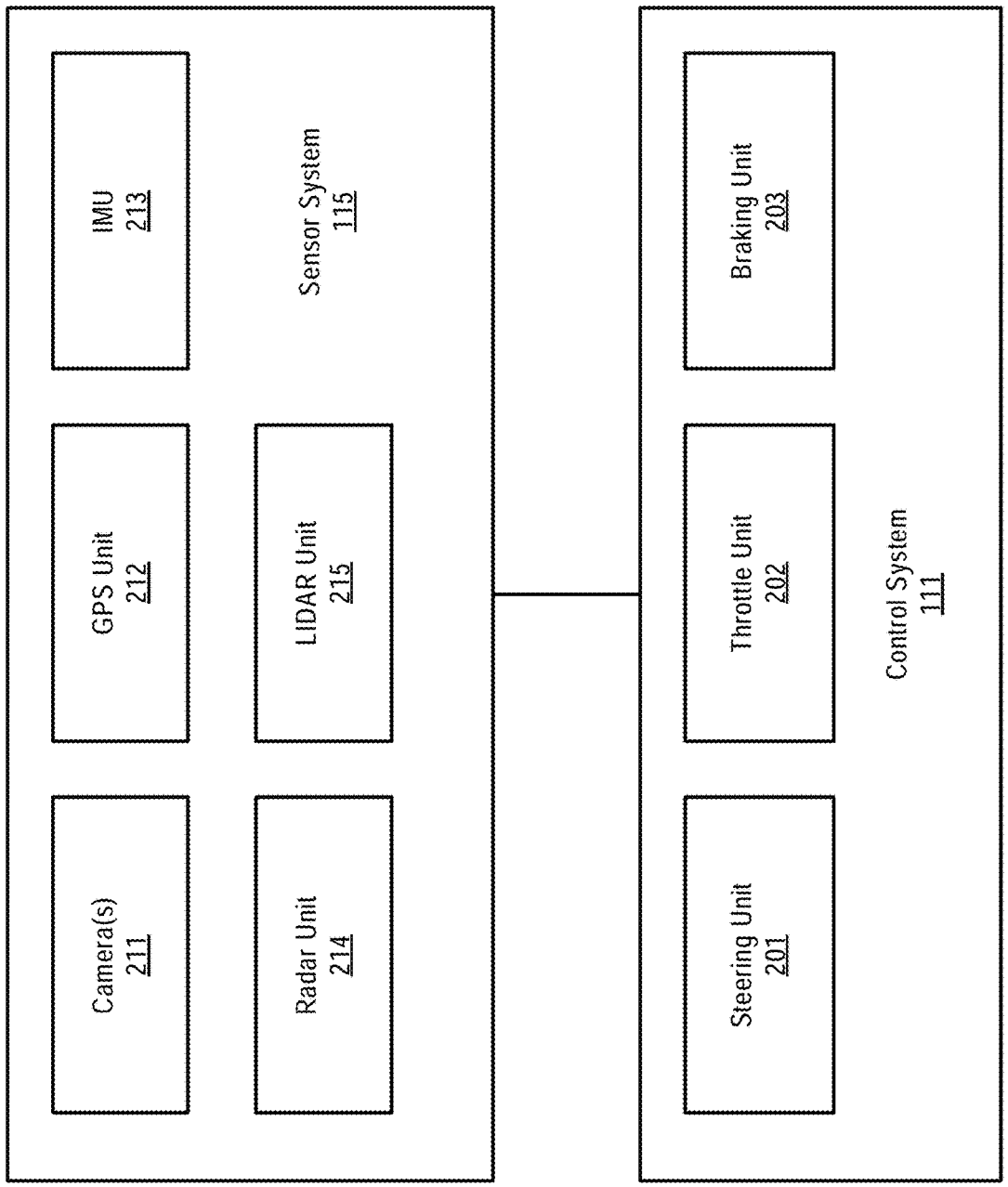
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, for example, algorithms 124 may include an optimization method to optimize path planning and speed planning. The optimization method may include a set of cost functions and polynomial functions to represent path segments or time segments. These functions can be uploaded onto the autonomous driving vehicle to be used to generate a smooth path at real time.

Figure 3A:
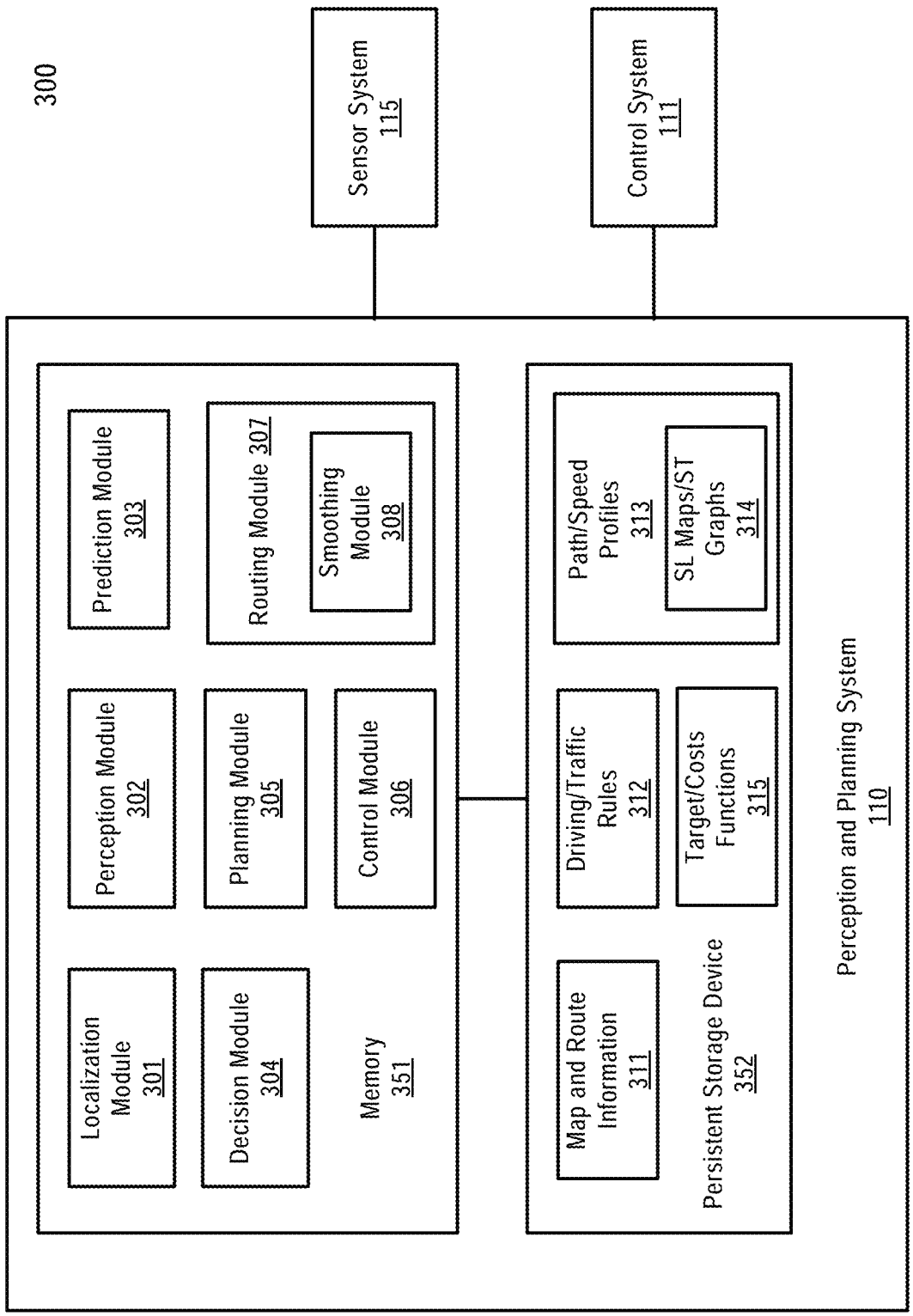
FIGS. 3A-3B are block diagrams illustrating an example of a perception and planning system used with an autonomous vehicle according to one embodiment.
Figure 3B:
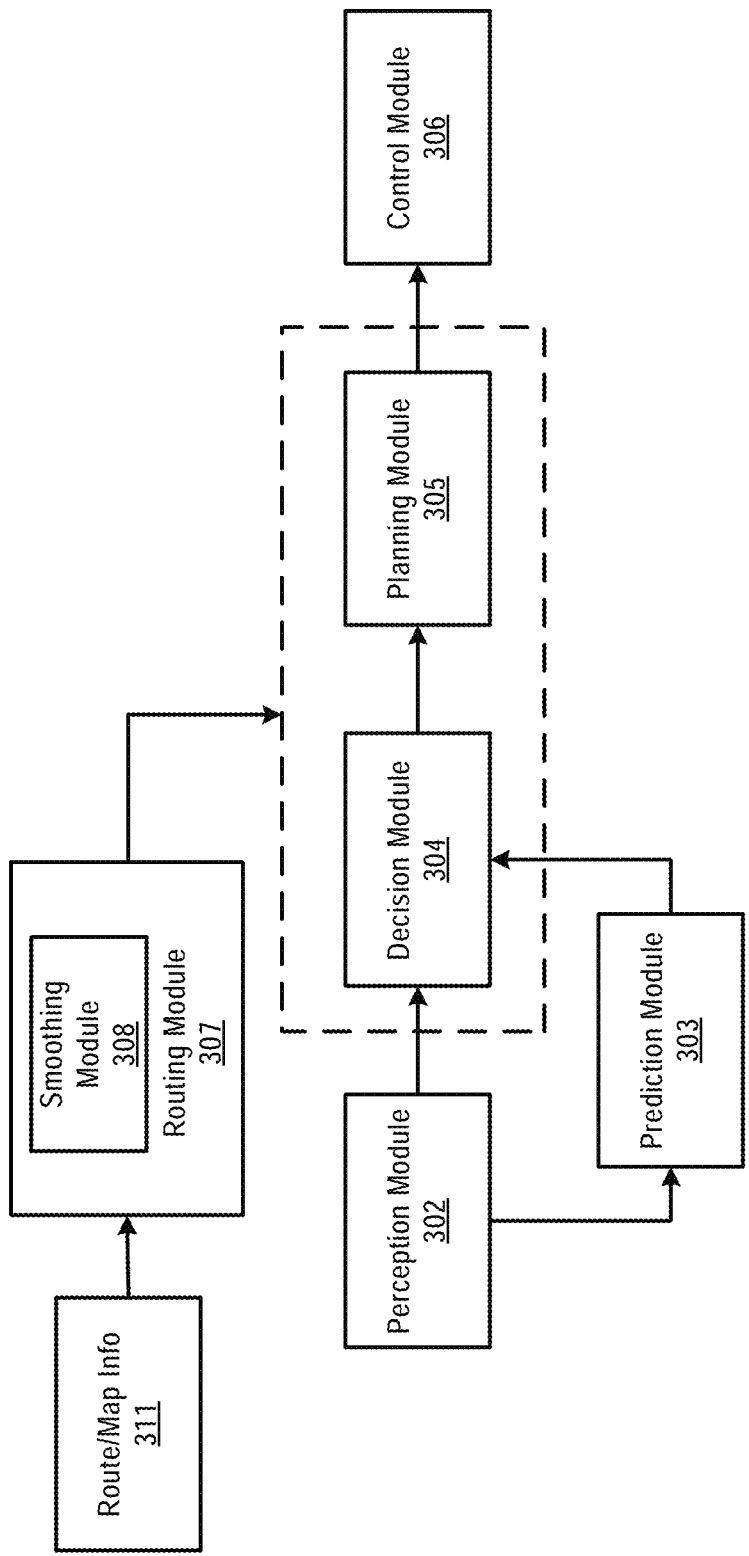

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and smoothing module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, decision module 304 and planning module 305 may be integrated as a single module; and routing module 307 and smoothing module 308 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road can be divided into sections or segments {A, B, and C} to denote three road segments. Three lanes of road segment A can be enumerated {A1, A2, and A3}. A reference route is generated by generating reference points along the reference route. For example, for a vehicular lane, routing module 307 can connect midpoints of two opposing curbs or extremities of the vehicular lane provided by a map data. Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

Smoothing module 308 can generate a smooth road reference line based on a reference line provided by routing module 307. For example, smoothing module 308 selects a number of control points along a reference line. In one embodiment, the control points can be reference points of the reference line provided by routing module 307 or some interpolated points along the reference line which are approximately equally distant to their adjacent points. Smoothing module 308 uses a combination of a quadratic programming spline smoother and a spiral smoother to generate the smooth road reference line.

As described above, route or routing module 307 manages any data related to a trip or route of a user. The user of the ADV specifies a starting and a destination location to obtain trip related data. Trip related data includes route segments and a reference line or reference points of the route segment. For example, based on route map info 311, route module 307 generates a route or road segments table and a reference points table. The reference points are in relations to road segments and/or lanes in the road segments table. The reference points can be interpolated to form one or more reference lines to control the ADV. The reference points can be specific to road segments and/or specific lanes of road segments.

For example, a road segments table can be a name-value pair to include previous and next road lanes for road segments A-D. E.g., a road segments table may be: {(A1, B1), (B1, C1), (C1, D1)} for road segments A-D having lane 1. A reference points table may include reference points in x-y coordinates for road segments lanes, e.g., {(A1, (x1, y1)), (B1, (x2, y2)), (C1, (x3, y3)), (D1, (x4, y4))}, where A1 . . . D1 refers to lane 1 of road segments A-D, and (x1, y1) . . . (x4, y4) are corresponding real world coordinates. In one embodiment, road segments and/or lanes are divided into a predetermined length such as approximately 200 meters segments/lanes. In another embodiment, road segments and/or lanes are divided into variable length segments/lanes depending on road conditions such as road curvatures. In some embodiments, each road segment and/or lane can include several reference points. In some embodiments, reference points can be converted to other coordinate systems, e.g., latitude-longitude.

In some embodiments, reference points can be converted into a relative coordinates system, such as station-lateral (SL) coordinates. A station-lateral coordinate system is a coordinate system that references a fixed reference point to follow a reference line. For example, a $(S, L)=(1, 0)$ coordinate can denote one meter ahead of a stationary point (i.e., the reference point) on the reference line with zero meter lateral offset. A $(S, L)=(2, 1)$ reference point can denote two meters ahead of the stationary reference point along the reference line and an one meter lateral offset from the reference line, e.g., offset to the left by one meter.

In one embodiment, smoothing module 308 generates a smooth reference line based on reference points representing a reference line provided by routing module 307. The smooth reference line can be converted into a relative coordinate system such as a SL coordinate system before a decision module and/or a planning module such as decision module 304 and/and planning module 305 incorporates the smooth reference line with perceived obstacles and/or traffic information.

In one embodiment, decision module 304 generates a rough path profile based on a reference line (the reference line having been smoothed by smoothing module 308 as described above) provided by routing module 307 and based on obstacles and/or traffic information perceived by the ADV, surrounding the ADV. The rough path profile can be a part of path/speed profiles 313 which may be stored in persistent storage device 352. The rough path profile is generated by selecting points along the reference line. For each of the points, decision module 304 moves the point to the left or right (e.g., candidate movements) of the reference line based on one or more obstacle decisions on how to encounter the object, while the rest of points remain steady. The candidate movements are performed iteratively using dynamic programming to path candidates in search of a path candidate with a lowest path cost using cost functions, as part of costs functions 315 of FIG. 3A, thereby generating a rough path profile. Examples of cost functions include costs based on: a curvature of a route path, a distance from the ADV to perceived obstacles, and a distance of the ADV to the reference line. In one embodiment, the generated rough path profile includes a station-lateral map, as part of SL maps/ST graphs 314 which may be stored in persistent storage devices 352.

In one embodiment, decision module 304 generates a rough speed profile (as part of path/speed profiles 313) based on the generated rough path profile. The rough speed profile indicates the best speed at a particular point in time controlling the ADV. Similar to the rough path profile, candidate speeds at different points in time are iterated using dynamic programming to find speed candidates (e.g., speed up or slow down) with a lowest speed cost based on cost functions, as part of costs functions 315 of FIG. 3A, in view of obstacles perceived by the ADV. The rough speed profile decides whether the ADV should overtake or avoid an obstacle, and to the left or right of the obstacle. In one embodiment, the rough speed profile includes a station-time (ST) graph (as part of SL maps/ST graphs 314). Station-time graph indicates a distance travelled with respect to time.

In one embodiment, planning module 305 recalculates the rough path profile in view of obstacle decisions and/or artificial barriers to forbid the planning module 305 to search the geometric spaces of the barriers. For example, if the rough speed profile determined to nudge an obstacle from the left, planning module 305 can set a barrier (in the form of an obstacle) to the right of the obstacle to prevent a calculation for the ADV to nudge an obstacle from the right. In one embodiment, the rough path profile is recalculated by optimizing a path cost function (as part of cost functions 315) using quadratic programming (QP) and/or a spiral smoother. In one embodiment, the recalculated rough path profile includes a station-lateral map (as part of SL maps/ST graphs 314).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
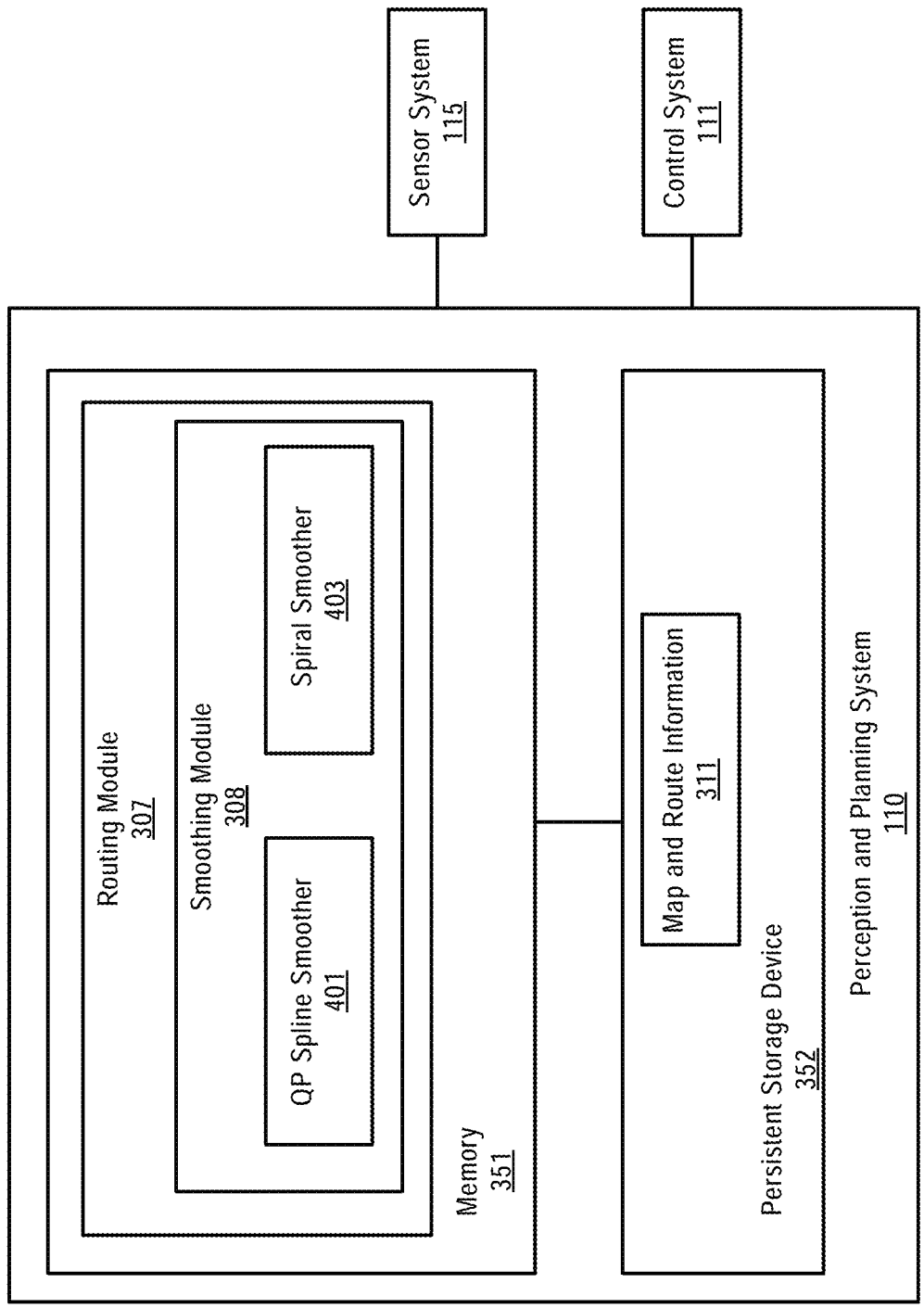
FIG. 4 illustrates an example smoothing module in accordance with an embodiment.

FIG. 4 illustrates an example smoothing module in accordance with an embodiment. As shown in FIG. 4, the smoothing module 308 can include a QP spline smoother 401 and a spiral smoother 403. The smoothing module 308 can generate a smooth reference line based on a reference line provided by routing module 307 by alternating the use of the QP spline smoother 401 and the spiral smoother 403. By applying both smoothers to a raw reference line, the smoothing module 308 can overcome the drawbacks of each smoother and generate a smoothed reference line with the desired continuity and smoothness of curvature.

As an illustrative example, given a raw reference line to be smoothed, the smoothing module 308 can select a number of control points along the reference line. The control points can be reference points of the reference line provided by routing module 307 or some interpolated points along the reference line which are approximately equally distant to their adjacent points.

The reference points can divide the reference line into a number of reference line segments. For example, the reference line segments can include a first reference line segment, a second reference segment, and a third reference line segment in a sequential order. The smoothing module 308 can apply the QP spline smoother 401 to the first reference line segment and to the third reference line segment, and apply the spiral smoother 403 to the second reference line segment. The smoothed second reference line segment can subsequently be optimized in view of a set of constraints, such that an output of the objective function reaches a minimum value while the set of constraints are satisfied. The above operations can be repeatedly performed until each reference segment is smoothly connected. The smoothed reference line segments can be connected to generate a smoothed reference line, which can be used as a reference line of the route to control the ADV.

Figure 5:
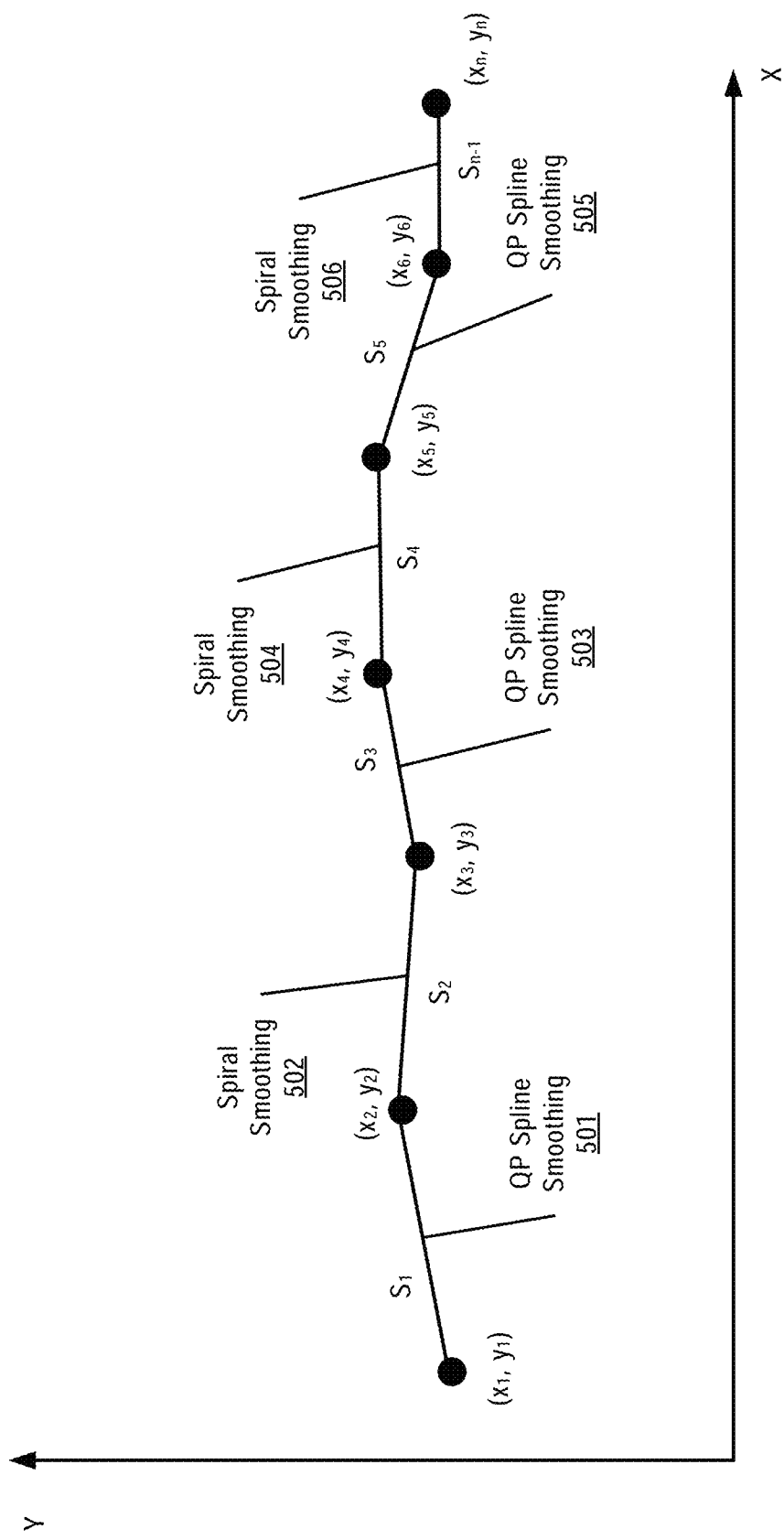
FIG. 5 illustrates an example implementation of a smoothing module in accordance with an embodiment.

FIG. 5 illustrates an example implementation of the smoothing module 308 in accordance with an embodiment. FIG. 5 shows a raw reference line received from the routing module 307. The raw reference line can a center line of a road segment obtained from a high definition map, and can include n reference points that divide the raw reference line into n−1 reference line segments. The reference points are $(x_1, y_1)$, $(x_2, y_2)$, $(x_3, y_3)$, $(x_4, y_4)$, $(x_5, y_5)$, $(x_6, y_6)$ and $(x_n, y_n)$. The reference line segments are $S_1$, $S_2$, $S_3$, $S_4$, $S_5$ and $S_{n-1}$. At each reference point, the ADV has a heading that represents the direction of the ADV. In this implementation, the headings of the ADV at the reference points are respectively $\theta_1$, $\theta_2$, $\theta_3$, $\theta_4$, $\theta_5$, and $\theta_6$.

The smoothing module 308 can first perform a QP spline smoothing operation 501 using the QP spline smoother 401 to the first reference line segment $S_1$, and perform another QP spline smoothing operation 503 using the QP spline smoother 401 to the third reference line segment S3.

From the above QP spline smoothing operations, the smoothing module 308 can generate additional information for reference point $(x_2, y_2)$ and reference point $(x_3, y_3)$. Thus, the two reference points can be respectively represented by $(x_2, y_2, kappa_2, dkappa_2, S_0)$ and $(x_3, y_3, kappa_3, dkappa_3, S_t)$, where $S_0$ is the distance of reference point $(x_2, y_2)$ to the beginning of the raw reference line, and $S_t$ is the distance of reference point $(x_3, y_3)$ to the beginning of the raw reference line.

After the first reference line segment and the third reference line segment S2 are smoothed using the QP spline smoother 501, the smoothing module 308 can perform a spiral smoothing operation 502 using the spiral smoother 403 to the second reference line segment. The rest of the reference line segments (i.e. $S_4$, $S_5$, and $S_{n-1}$) can be similarly smoothed by alternating the use of the QP spline smoother 401 and the spiral smoother 403 to perform a number of smoothing operations 504, 505 and 506.

In one embodiment, each smoothed reference line segments can be optimized in view one or more constraints such as road boundary constraints, perceived obstacles, and some limitations of the ADV, e.g., turning radius.

Once all the reference line segments are smoothed and/or optimized, the smoothing module 308 can connect the smoothed reference line segments together to create a smoothed reference line.

Figure 6:
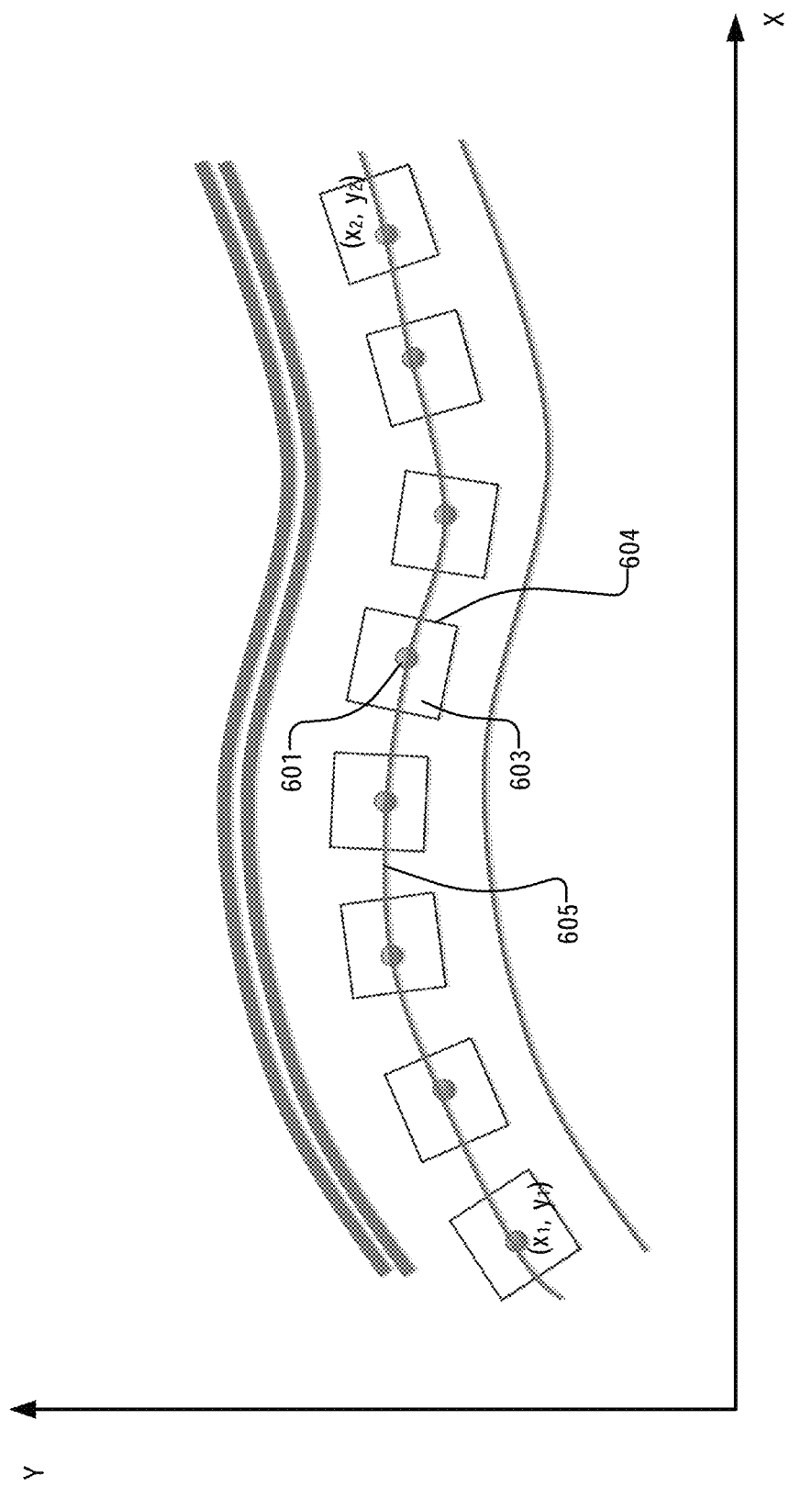
FIG. 6 illustrate an example use of a QP spline smoother in accordance with an embodiment.

FIG. 6 illustrate an example use of the QP spline smoother in accordance with an embodiment. As shown in FIG. 6, a road segment (i.e., the first reference line segment $S_1$ shown in FIG. 5) can include a number of control points such as control points 601. The control points can be approximately equally spaced apart, for example, approximately five to ten meters apart.

Based on control points 601, the QP spline smoother 401 can apply a 2D spline optimization to generate a smooth reference line, such as spline 605. A spline is a curve represented by one or more (e.g., piecewise) polynomials joined together to form the curve. For example, a polynomial or a polynomial function can represent a segment between adjacent control points. In one embodiment, each polynomial function within the spline can be a two dimensional polynomial(s), e.g., $$x(t)=p_0+p_1t+p_2t^2+ \ldots +p_nt^n, \text{ and } y(t)=q_0+q_1t+q_2t^2+ \ldots +q_nt^n,$$

where x, y represents a two dimensional (x, y) geometric coordinate for a polynomial to the nth order, and $p_{0 \ldots n}$ and $q_{0 \ldots n}$ are coefficients of the two dimensional polynomial to be solved.

In another embodiment, the polynomial function can be one dimensional. E.g., $$l(s)=p_0+p_1s+p_2s^2+ \ldots +p_ns^n,$$

where s, l represents a station-lateral one dimensional (s, l) geometric coordinate for a polynomial to the nth order, and $p_{0 \ldots n}$ are coefficients of the one dimensional polynomials to be solved.

In one embodiment, the QP spline smoother 401 can configure an order of polynomial for the spline or piecewise polynomials to ensure a desired threshold of spline smoothness. In one embodiment, the piecewise polynomials can be preconfigured to a fifth order polynomial. Based on the control point 601, the QP spline smoother 401 can define a boundary area, such as boundary box 603 with a predefined dimension, such as, approximately 0.2 meters by 0.2 meters, to surround each of the control points 601. The boundary areas can represent an inequality constraint that the smooth reference line (e.g., spline or piecewise polynomials) 605 must touch or pass through.

In one embodiment, the QP spline smoother can add a set of initial constraints to the piecewise polynomials. The set of initial constraint can correspond to a current geographical location and/or a current directional heading of the ADV, for example, $$x(0)=x_0 \text{ and } y(0)=y_0,$$

$$x'(0)=dx_0 \text{ and } y'(0)=dy_0,$$

where $(x_0, y_0)$ is the current x-y coordinate of the ADV geographical location, $(dx_0, dy_0)$ is a current direction of the ADV, and $x(0)$, $y(0)$ corresponds to the initial values of the first x-y polynomial. In some embodiments, constraint module 603 can add a set of end constraints corresponding to a location and a direction of the ADV when the ADV reaches a destination point.

In some embodiments, the QP spline smoother 401 can select a target function with various kernels or costs functions which the spline will target on. Example target functions can include smoothing kernels and/or guidance kernels such as:

$$w_1 \int (x')^2(t)dt + w_2 \int (y')^2(t)dt + w_3 \int (x'')^2(t)dt +$$
$$w_4 \int (y'')^2(t)dt + w_5 \int (x''')^2(t)dt + w_6 \int (y''')^2(t)dt +$$
$$w_7 \int [x(t) - x_{ref}(t)]^2 dt + w_8 \int [y(t) - y_{ref}(t)]^2 dt$$

where $x(t)$, $y(t)$ are x-y two dimensional piecewise polynomials, $w_1, \ldots, w_8$ are weight factors, $(x')^2(t)$, $(y')^2(t)$ are the first derivative squares of the piecewise polynomials, $(x'')^2(t)$, $(y'')^2(t)$ are the second derivative squares of the piecewise polynomials, $(x''')^2(t)$, $(y''')^2(t)$ are the third derivative squares of the piecewise polynomials, and $x_{ref}(t)$, $y_{ref}(t)$ are x-y reference route values of average human driving routes from previously collected data.

In one embodiment, the QP spline smoother 401 can solve the target function to generate a smooth reference line. In one embodiment, a QP optimization can be performed on the target function such that the target function reaches a predetermined threshold (e.g., minimum), while the set of constraints are satisfied. Once the target function has been optimized in view of the constraints, the coefficients of the polynomial functions can be determined. Then the location of the path points (e.g., control points) along the path can be determined using the polynomial function with the optimized coefficients, which represents a smooth reference line. As described above, the smoothing function is incorporated into the target function to be solved, i.e., the smoothing is not a post processing step ensuring the optimized reference line after applying a smoothing function would still be bound to the set of defined constraints.

Figure 7:
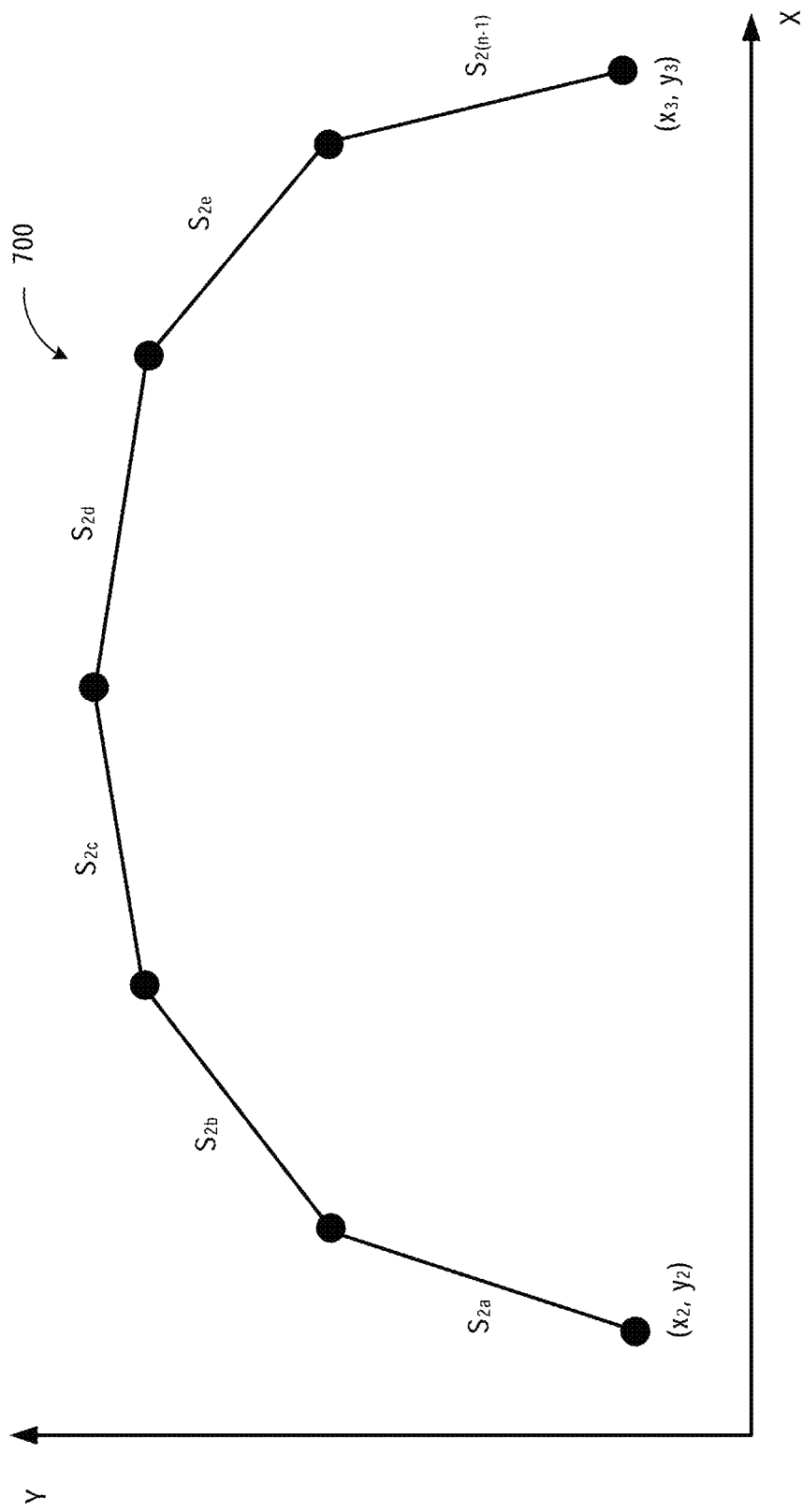
FIG. 7 illustrate an example use of a spiral smoother accordance with an embodiment.

FIG. 7 illustrate an example use of the spiral smoother 403 in accordance with an embodiment. In this example, the reference line segment 700 can represent the second reference line segment S2 from reference point $(x_2, y_2)$ to reference point $(x_3, y_3)$. As shown, the reference line segment is further divided into a number of reference line segments. Each reference line segment is associated with a segment length, for example, $S_{2a}$, $S_{2b}$, $S_{2c}$, ... $S_{2(n-1)}$, and can be modeled using a separate quintic polynomial function.

For each of the reference line segments, the spiral smoother 403 can generate a quintic polynomial function θ(s). Thus, there are at least (n−1) quintic polynomial functions $\theta_0(s)$ to $\theta_{n-1}(s)$. Each quintic polynomial function represents a direction of a starting reference point of the corresponding reference line segment. A derivative (e.g., the first order derivative) of the quintic polynomial function represents a curvature of the starting reference point of the reference line segment, $K = d\theta/ds$. A second order derivative of the quintic polynomial function represents a curvature change or curvature change rate, $dK/ds$.

For the purpose of illustration, following terms are defined:

$\theta_0$: starting direction
$\dot\theta_0$: starting curvature, κ, direction derivative w.r.t. curve length, i.e., $$\frac{d\theta}{ds}$$

$\ddot\theta_0$: starting curvature derivative, i.e., $$\frac{dn}{ds}$$

$\theta_1$: ending direction
$\dot\theta_1$: ending curvature
$\ddot\theta_1$: ending curvature derivative
Δs: the curve length between the two ends Each piecewise spiral path is decided by seven parameters: starting direction ($\theta_0$), starting curvature ($d\theta_0$), starting curvature derivative ($d2\theta_0$), ending direction ($\theta_1$), ending curvature ($d\theta_1$), ending curvature derivative ($d2\theta_1$) and the curve length between the starting and ending points (Δs). In one embodiment, a quintic polynomial function can be defined as follows:\

$$\theta_i(s) = a*s^5 + b*s^4 + c*s^3 + d*s^2 + e*s + f, \text{ which satisfies}$$

$$\theta_i(0) = \theta_i$$
$$\dot\theta_i(0) = \dot\theta_i$$
$$\ddot\theta_i(0) = \ddot\theta_i$$
$$\theta_i(\Delta s) = \theta_{i+1}$$
$$\dot\theta_i(\Delta s) = \dot\theta_{i+1}$$
$$\ddot\theta_i(\Delta s) = \ddot\theta_{i+1}$$

Based on the above constraints, the optimization is performed on all quintic polynomial functions of all reference line segments, such that the output of a quintic polynomial function representing reference line segment (i) at zero segment length should be the same as or similar to a direction at the starting reference point of the corresponding reference line segment (i). A first order derivative of the quintic polynomial function should be the same as or similar to a curvature at the starting reference point of the reference line segment (i). A second order derivative of the quintic polynomial function should be the same as or similar to a curvature change rate at the starting reference point of the reference line segment (i). Similarly, the output of a quintic polynomial function representing reference line segment (i) at the full segment length (s) should be the same as or similar to a direction at the starting reference point of the next reference line segment (i+l), which is the ending reference point of the current reference line segment (i). A first order derivative of the quintic polynomial function should be the same as or similar to a curvature at the starting reference point of the next reference line segment (i+l). A second order derivative of the quintic polynomial function should be the same as or similar to a curvature change rate at the starting reference point of the next reference line segment (i+l).

By substituting the above variables, there will be six equations that can be utilized to solve the coefficients of the quintic polynomial function a, b, c, d, e, and f. For example, as stated above, the direction at a given point can be defined using the above quintic polynomial function:

$$\theta(s) = as^5 + bs^4 + cs^3 + ds^2 + es + f$$

The first order derivative of the quintic function represents a curvature at the point of the path:

$$d\theta = 5as^4 + 4bs^3 + 3cs^2 + 2ds + e$$

The second order derivative of the quintic function represents a curvature change rate at the point of the path:

$$d^2\theta = 20as^3 + 12bs^2 + 6cs + 2d$$

For a given spiral path or reference line segment, there are two points involved: a starting point and an ending point, where the direction, curvature, and curvature change rate of each point can be represented by the above three equations respectively. Thus, there are a total of six equations for each spiral path or reference line segment. These six equations can be utilized to determine the coefficients a, b, c, d, e, and f of the corresponding quintic function.

When a spiral path is utilized to represent a curve between consecutive reference points in the Cartesian space, there is a need to build a connection or bridge between the spiral path curve length and a position in the Cartesian space. Given a spiral path $\theta_i(s)$ defined by {$\theta_i$, $d\theta_i$, $d^2\theta_i$, $\theta_{i+l}$, $d\theta_{i+l}$, $d^2\theta_{i+l}$, Δs}, and path starting point $p_i=(x_i, y_i)$, the coordinate of point p=(x, y) can be determined given any s=[0, Δs]. In one embodiment, the coordinates of a given point can be obtained based on the following formula:

$$x = x_i + \int_0^s \cos(\theta_i(s))ds$$

$$y = y_i + \int_0^s \sin(\theta_i(s))ds$$

When s=Δs, the ending coordinates $p_i$+l are obtained given curve $\theta_i$ and starting coordinates $p_i=(x_i, y_i)$. The optimization of the quintic functions are performed such that the overall output of the quintic functions of the spiral paths reach minimum, while the above set of constraints are satisfied. In addition, the coordinates of the terminal point derived from the optimization is required to be within a predetermined range (e.g., tolerance, error margins) with respect to the corresponding coordinates of the initial reference line. That is, the difference between each optimized point and the corresponding point of the initial reference line should be within a predetermined threshold.

According to one embodiment, an objective function is defined based on the quintic functions of all spiral paths. An optimization is performed on the input parameters of the quintic functions of the objective function, while the constraints described above are satisfied. In one embodiment, the objective function represents a sum of all quintic functions associated with all reference line segments, and the optimization is performed, such that the output of the objective function reaches minimum while the above set of constraints are satisfied. The optimization is iteratively performed, the variables are modified, and the set of constraints are evaluated, until the output of the objective function in a current iteration is similar to the output of the objective function in a previous iteration. The term of "similar" herein refers to the difference between the outputs of two consecutive iterations is below a predetermined threshold.

In this approach, a reference line (e.g., a reference line segment such as the second reference line segment $S_2$ as shown in FIG. 5) can be modeled as a sequence of piecewise quintic spiral paths with two consecutive reference points connected with one spiral path. The input points are allowed to slightly deviate from their original positions within a predetermined boundary or boundaries, which may be defined or configured by a user. The boundaries model the confidence level of the sensor accuracy, handling labeling errors, etc., when generating the map data. In one embodiment, the variables in the optimization are selected as follows, given n points $$p_0 = (\bar{x}_0, \bar{y}_0), \ldots, p_{n-1} = (\bar{x}_{n-1}, \bar{y}_{n-1}):$$

| $\theta_0$ | $\theta_1$ | $\theta_2$ | ... | $\theta_{n-2}$ | $\theta_{n-1}$ |
| $\dot{\theta}_0$ | $\dot{\theta}_1$ | $\dot{\theta}_2$ | ... | $\dot{\theta}_{n-2}$ | $\dot{\theta}_{n-1}$ |
| $\ddot{\theta}_0$ | $\ddot{\theta}_1$ | $\ddot{\theta}_2$ | ... | $\ddot{\theta}_{n-2}$ | $\ddot{\theta}_{n-1}$ |
| $\Delta s_0$ | $\Delta s_1$ | | ... | $\Delta s_{n-2}$ | |

The smoothness of the reference line is modeled as the absolute value of the curvature change rate, i.e., a second order derivative of quintic function $\theta(s)$.

According to one embodiment, each of the reference line segment is segmented into a number of sub-segments. Each sub-segment represents a piecewise sub-path within the piecewise path of the reference line segment. Each sub-segment is represented by the quintic function of the same reference line segment. Thus, there are m intermediate points from one piecewise path as probing points. The goal is to minimize the quintic functions of the sub-segments. An objective function is defined as a sum of the outputs of the quintic functions of the sub-segments of each of the reference line segments. In one embodiment, an objective function is defined as follows:

$$\sum_{i=0}^{n-2}\sum_{j=0}^{m-1} \ddot{\theta}_i(s_j)^2$$

subject to the following point positional movement constraints:

$$(x_i - \bar{x}_i)^2 + (y_i - \bar{y}_i)^2 \leq r_i^2$$

-continued $$\dot{\theta}(s_0) = kappa_2$$

$$\dot{\theta}(s_t) = kappa_3$$

where r is a tunable parameter.

In one embodiment, the objective function represents a sum of square of a second derivative of each quintic polynomial function. Coordinates $(x_i, y_i)$ represent the original position of input point $p_i$, and $r_i$ represents a boundary for point $p_i$, which may be user configurable. Coordinates $(x_i, y_i)$ are derived based on the integrals of the corresponding quintic functions as described above.

Figure 8:
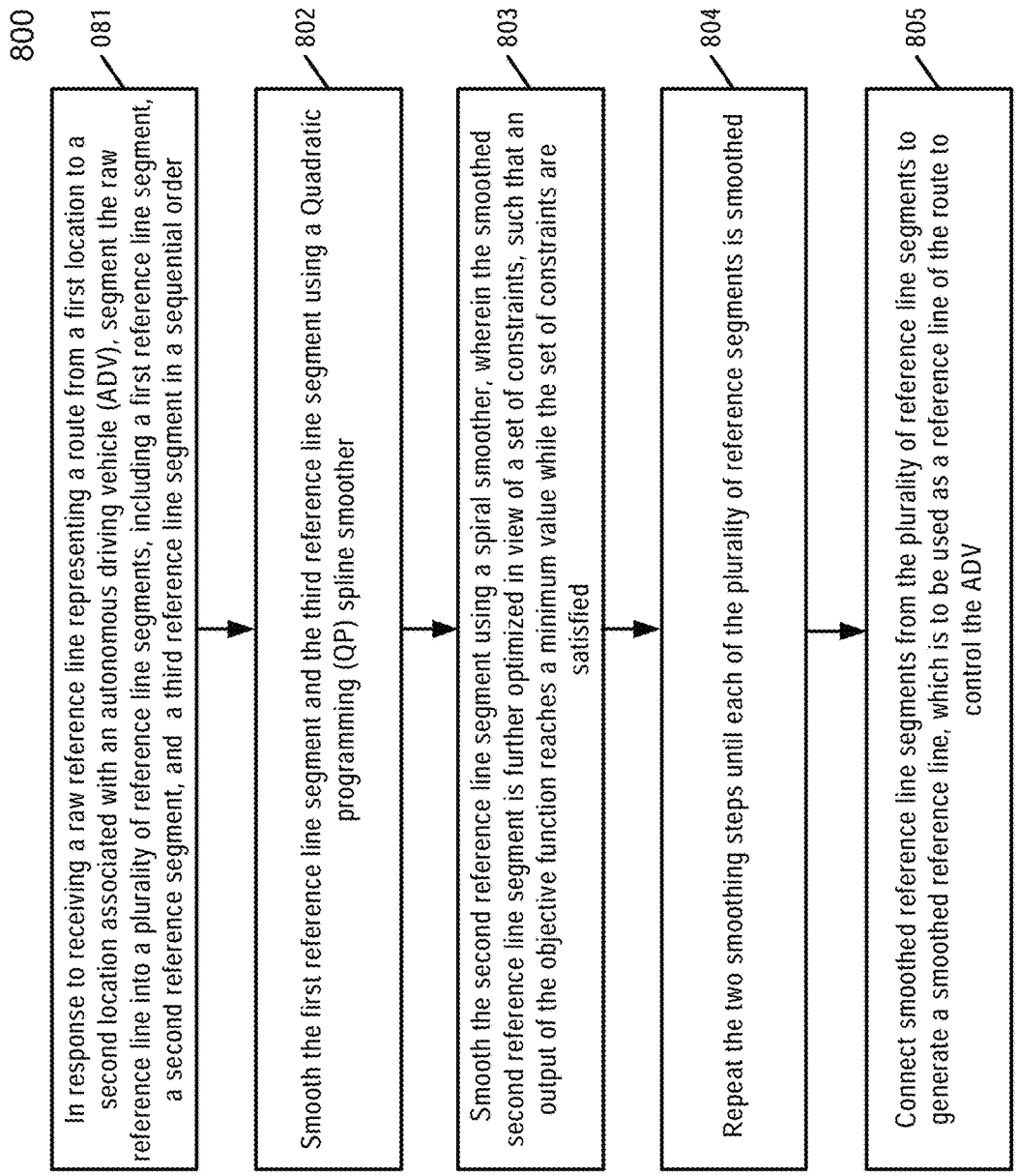
FIG. 8 is a flow diagram illustrating an example of a process for smoothing a reference line according to one embodiment.

FIG. 8 is a flow diagram illustrating an example of a process for smoothing a reference line according to one embodiment. Process 800 may be performed by processing logic which may include software, hardware, or a combination thereof. For example, process 800 may be performed by planning module 305 of FIG. 4. Referring to FIG. 8, in operation 801, the processing logic segments a raw reference line into a plurality of reference line segments, including a first reference line segment, a second reference segment, and a third reference line segment in a sequential order, in response to receiving the raw reference line representing a route from a first location to a second location associated with an autonomous driving vehicle (ADV). In operation 802, the processing logic smooths the first reference line segment and the third reference line segment using a Quadratic programming (QP) spline smoother. In operation 803, The processing logic smooths the second reference line segment using a spiral smoother, and further optimizes the smoothed second reference line segment in view of a set of constraints, such that an output of the objective function reaches a minimum value while the set of constraints are satisfied. In operation 804, the processing logic repeats the two smoothing steps until each of the plurality of reference segments is smoothed. In operation 805, the processing logic connects smoothed reference line segments from the plurality of reference line segments to generate a smoothed reference line, which is to be used as a reference line of the route to control the ADV.

Figure 9:
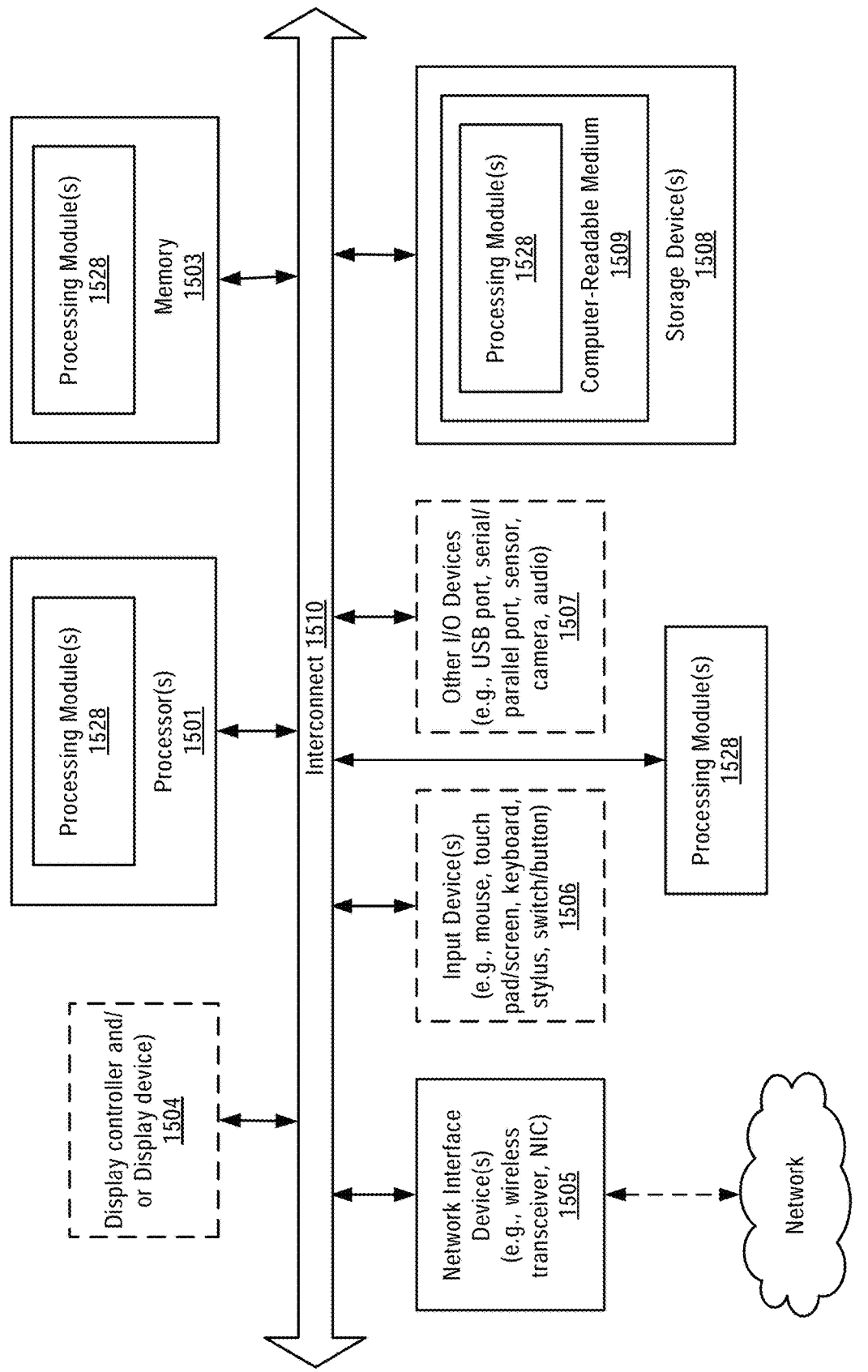
FIG. 9 is a block diagram illustrating an example of a data processing system which may be used with one embodiment of the disclosure.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include JO devices such as devices 1505-1508, including network interface device(s) 1505, optional input device(s) 1506, and other optional JO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other JO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   in response to receiving an initial reference line representing a route from a first location to a second location associated with an autonomous driving vehicle (ADV), segmenting, by a processor, the initial reference line into a plurality of reference line segments, including a first reference line segment, a second reference segment, and a third reference line segment in sequence;
   smoothing, by the processor, the first reference line segment and the third reference line segment using a Quadratic programming (QP) spline smoothing algorithm;
   smoothing, by the processor, the second reference line segment using a spiral smoothing algorithm;
   connecting, by the processor, smoothed reference line segments from the plurality of reference line segments including the first reference line segment, the second reference segment, and the third reference line segment in a sequential order to generate a smoothed reference line, which is to be used as a reference line of the route to control the ADV, wherein the first reference line segment is connected to the second reference line segment, the second referenced line segment is connected to the third referenced line segment, and the second referenced line segment smoothed by using the QP spline smoothing algorithm is between the first reference line segment and the third reference line segment smoothed by using the spiral smoothing algorithm;
   planning a trajectory based on the smoothed reference line; and
   controlling the ADV based on the trajectory.

2. The method of claim 1, further comprising iteratively performing smoothing using the QP spline smoothing algorithm and performing smoothing using the spiral smoothing algorithm in an alternating manner for all of the reference line segments.

3. The method of claim 1, wherein a length of each of the plurality of reference line segments is dynamically determined based on road conditions of the route and a speed of the ADV.

4. The method of claim 1, wherein at least one of the reference line segments is different in length from at least one other reference line segment.

5. The method of claim 1, wherein smoothing the first reference line segment and the second reference line segment occurs during a same planning cycle.

6. The method of claim 1, wherein smoothing the first reference line segment and the second reference line segment occurs during different planning cycles.

7. The method of claim 1, wherein each of the first reference segment, the second reference line segment, and the third reference line segment is smoothed and optimized in a different planning cycle.

8. The method of claim 1, wherein at least one of a set of constraints are dynamically tunable, wherein the set of constraints represent an initial location, a direction, and a curvature of the ADV.

9. A non-transitory machine-readable medium having instructions stored therein for operating an autonomous driving vehicle (ADV), the instructions, when executed by a processor, causing the processor to perform operations, the operations comprising:
in response to receiving an initial reference line representing a route from a first location to a second location associated with an autonomous driving vehicle (ADV), segmenting the initial reference line into a plurality of reference line segments, including a first reference line segment, a second reference segment, and a third reference line segment in sequence;
smoothing the first reference line segment and the third reference line segment using a Quadratic programming (QP) spline smoothing algorithm;
smoothing the second reference line segment using a spiral smoothing algorithm;
connecting smoothed reference line segments from the plurality of reference line segments including the first reference line segment, the second reference segment, and the third reference line segment in a sequential order to generate a smoothed reference line, which is to be used as a reference line of the route to control the ADV, wherein the first reference line segment is connected to the second reference line segment, the second referenced line segment is connected to the third referenced line segment, and the second referenced line segment smoothed by using the QP spline smoothing algorithm is between the first reference line segment and the third reference line segment smoothed by using the spiral smoothing algorithm;
planning a trajectory based on the smoothed reference line; and
controlling the ADV based on the trajectory.

10. The machine-readable medium of claim 9, wherein the operations further comprise iteratively performing smoothing using the QP spline smoothing algorithm and performing smoothing using the spiral smoothing algorithm in an alternating manner for all of the reference line segments.

11. The machine-readable medium of claim 9, wherein a length of each of the plurality of reference line segments is dynamically determined based on road conditions of the route and a speed of the ADV.

12. The machine-readable medium of claim 9, wherein at least one of the reference line segments is different in length from at least one other reference line segment.

13. The machine-readable medium of claim 9, wherein smoothing the first reference line segment and the second reference line segment occurs during a same planning cycle.

14. The machine-readable medium of claim 9, wherein smoothing the first reference line segment and the second reference line segment occurs during different planning cycles.

15. The machine-readable medium of claim 9, wherein each of the first reference segment, the second reference line segment, and the third reference line segment is smoothed and optimized in a different planning cycle.

16. The machine-readable medium of claim 9, wherein at least one of a set of constraints are dynamically tunable, wherein the set of constraints represent an initial location, a direction, and a curvature of the ADV.

17. A data processing system, comprising:
a processor; and
a memory coupled to the processor to store instructions, which when executed by the processor, cause the processor to perform operations, the operations including
in response to receiving an initial reference line representing a route from a first location to a second location associated with an autonomous driving vehicle (ADV), segmenting the initial reference line into a plurality of reference line segments, including a first reference line segment, a second reference segment, and a third reference line segment in sequence,
smoothing the first reference line segment and the third reference line segment using a Quadratic programming (QP) spline smoothing algorithm,
smoothing the second reference line segment using a spiral smoothing algorithm,
connecting smoothed reference line segments from the plurality of reference line segments including the first reference line segment, the second reference segment, and the third reference line segment in a sequential order to generate a smoothed reference line, which is to be used as a reference line of the route to control the ADV, wherein the first reference line segment is connected to the second reference line segment, the second referenced line segment is connected to the third referenced line segment, and the second referenced line segment smoothed by using the QP spline smoothing algorithm is between the first reference line segment and the third reference line segment smoothed by using the spiral smoothing algorithm;
planning a trajectory based on the smoothed reference line; and
controlling the ADV based on the trajectory.

18. The system of claim 17, wherein the operations further comprise iteratively performing smoothing using the QP spline smoothing algorithm and performing smoothing using the spiral smoothing algorithm in an alternating manner for all of the reference line segments.

19. The system of claim 17, wherein a length of each of the plurality of reference line segments is dynamically determined based on road conditions of the route and a speed of the ADV.

20. The system of claim 17, wherein at least one of the reference line segments is different in length from at least one other reference line segment.

\* \* \* \* \*